United States Patent [19]
Wischmann et al.

[11] Patent Number: 5,761,332
[45] Date of Patent: Jun. 2, 1998

[54] METHOD OF RECONSTRUCTING THE SURFACE OF AN OBJECT

[75] Inventors: Hans-Aloys Wischmann, Hamburg; Ralf Drenckhahn, Seevetal, both of Germany

[73] Assignee: U.S. Philips Corporation, New York, N.Y.

[21] Appl. No.: 613,936

[22] Filed: Mar. 11, 1996

[30] Foreign Application Priority Data

Mar. 11, 1995 [DE] Germany ............... 195 08 823.9

[51] Int. Cl.$^6$ .............................................. G06K 9/00
[52] U.S. Cl. ........................ 382/131; 382/154; 395/120
[58] Field of Search ............................ 382/131, 154, 382/268; 364/468.04; 395/119, 120, 121

[56] References Cited

U.S. PATENT DOCUMENTS

| | | | |
|---|---|---|---|
| 4,831,528 | 5/1989 | Crawford et al. | 364/413.22 |
| 5,012,190 | 4/1991 | Dössel | 324/248 |
| 5,189,626 | 2/1993 | Colburn | 364/474.24 |
| 5,440,674 | 8/1995 | Park | 395/123 |
| 5,506,947 | 4/1996 | Taubin | 395/133 |
| 5,517,602 | 5/1996 | Natarajan | 395/119 |

FOREIGN PATENT DOCUMENTS 0406963  1/1991  European Pat. Off. ......... A61B 5/04

OTHER PUBLICATIONS

Excerpt pp. 382–391, *IEEE Transactions On Biomedical Engineering*, vol.36, No.3, Mar., 1989 "Source Parameter Estimation in Inhomogeneous Volume Conductors of Arbitrary Shape", Thom F. Oostendorp and Adriaan Van Oosterom.

Primary Examiner—Andrew Johns
Attorney, Agent, or Firm—Jack D. Slobod

[57] ABSTRACT

A method of reconstructing the surface of an object by the boundary element method (BEM), approximately describes a measured, closed object surface (K) by a number of initial triangles, the position of the vertices (E1, E2) of which is known and also the normals ($n_1$, $n_2$) to the measured object surface (K) at these vertices (E1, E2), the initial triangles are replaced by sub-triangles, having no more than two vertices corresponding to vertices of an initial triangle (E1, E), in order to enhance the approximative description. An as accurate as possible description of the surface is obtained at little cost in respect of storage time and calculation time in that a curved connecting line (P) is determined through two vertices of the initial triangle (E1, E2) in such a manner that the connecting line (P) extends perpendicularly to the normals ($n_1$, $n_2$) at the vertices of the initial triangle (E1, E2), and in that a new vertex of a sub-triangle (E31) is chosen on the curved connecting line (P).

10 Claims, 3 Drawing Sheets

METHOD OF RECONSTRUCTING THE SURFACE OF AN OBJECT

BACKGROUND OF THE INVENTION

1. Field of the Invention

The invention relates to a method of reconstructing the surface of an object by the boundary element method, in which a measured, closed object surface is approximately described by a number of triangles, the position of the vertices of which is known and also the normals to the measured object surface in these vertices, said triangles being replaced by sub-triangles, having no more than two vertices corresponding to vertices of an initial triangle, in order to enhance said approximative description.

One field of application of this method is the examination of bioelectric and biomagnetic signals in medicine, particularly the analysis of electroencephalograms/ electrocardiograms (EEC/ECG) and magnetoencephalograms/magnetocardiograms (MEG/MCG). Accurate reconstruction of electric currents in the human body is possible only if the electromagnetic signals can be calculated on the basis of a realistic body model derived, for example from MR or CT images.

2. Description of the Related Art

A method of reconstructing the spatial current density distribution in a biological object is known from EP-A 406 963. The bioelectric and biomagnetic signals of a patient are externally measured, i.e. in a non-invasive manner. However, these signals are generated mainly by reverse, so-called volume currents inside the body which are dependent on the spatial distribution of the conductivity. Therefore, correct modelling of the real body volume is an absolute necessity, it being necessary to describe not only the outer contours but also the boundaries of internal organs (or of tissues of uniform conductivity).

Such an abstracted volume conductor model of the body is used for the reconstruction of the signals. Analytic formulas exist only for simple geometric volumes such as spheres. Generally speaking, however, the body regions to be examined (for example, the thorax or the head) cannot be adequately represented by such simple geometries. According to the boundary element method (abbreviated hereinafter as BEM), a body is approximately described by a multitude of small surface elements.

IEEE Transact. on Biomed. Engineering, Vol. 36, No. 3, pp. 382–391 discloses a method in which the sources of electromagnetic signals of a body are determined by means of BEM. The integrals to be calculated over the boundary surface of the body are replaced by summing operations over smaller triangles which approximately describe the body surface as a coherent mesh. The integrals are individually calculated numerically in a number of discrete points, in this case being the centres of the triangles.

When the method is used for the analysis of EEG/ECG and MEG/MCG, a scalar product or a vector product with the local surface normals is to be calculated upon summation. The surface normal is constant across the entire triangle in the case of a flat triangle and only approximately equal to the mean of the variable normals of the modelled surface segment. The use of surface normals which are locally as correct as possible, therefore, is a basic condition in achieving correct integration values and hence an accurate reconstruction.

SUMMARY OF THE INVENTION

It is an object of the invention to conceive a method of the kind set forth in such a manner that the accuracy of the surface description is enhanced at an as low as possible cost in respect of notably computation time and storage capacity.

This object is achieved in accordance with the invention in that a curved connecting line is determined through two vertices of the initial triangle in such a manner that the connecting line extends perpendicularly to the normals at the vertices of the initial triangle, and that a new vertex of a sub-triangle is chosen on the curved connecting line.

According to the known method, a respective new vertex is chosen at the middle of each of the three sides of an initial triangle. Using these three new vertices and the three original vertices, the initial triangle is subdivided into four smaller sub-triangles. However, because the sub-triangles are situated in the plane of the initial triangle, this refinement of the mesh of triangles does not significantly improve the description of the object surface.

The method in accordance with the invention takes into account the local curvature of the object, so that the description of the surface is substantially more exact. A curved connecting line is to be understood to mean herein a line which deviates from the straight connecting line (=edge line of an initial triangle) and is curved in one direction only. Multiply curved lines, such as one or more sinusoidal oscillations, are not meant to be included. In comparison with the constant value of the surface normals of the prior-art flat sub-triangles the various surface normals of the new sub-triangles correspond substantially better to the local normals of the given object. Without information concerning the new vertices being known or stored in advance, the object surface can be simply and quickly described by spatially adapted sub-triangles.

In one version of the method in accordance with the invention the curved connecting line is shaped as a parabola or a segment of circle approximating the measured object surface between the vertices of the initial triangle. When the connecting line is chosen in this manner, in most cases the measured object surface can be suitably approximated at little computational cost.

In a preferred version of the method of the invention, the new vertex is situated at equal distances from the two neighboring vertices of the initial triangle. Assuming that measured values are present in the two vertices of the initial triangle (for example, potential values), the new vertex is situated in the plane extending perpendicularly to the straight connecting line halfway between these two vertices. It has been found that in this position the real value often corresponds to the mean value of the measured values in these vertices.

A device for carrying out the method includes:
- a measuring device for acquiring the position information of points on an object surface and also the information concerning the normals to the object surface in these points,
- an image memory for storing said position and normal information,
- an image processing unit for forming an approximative description of the object surface by triangles by means of the boundary element method, and
- an arithmetic unit for calculating further new vertices in order to determine sub-triangles which replace the initial triangles.

The method of the invention can be carried out in a device for the reconstruction of the current density distribution in a biological object, which device also comprises:
- a measuring device for determining the magnetic flux density and/or the electric field strength outside the object, a storage device for storing the flux density and/or field strength values thus acquired, an image forming device for forming images of the object, and a reconstruction unit for determining the current density distribution in the object.

A further embodiment of the invention is provided with a user interface for controlling the execution of the method.

Via this user interface, the user can specify, for example the degree of refinement, i.e. how often the method is performed in succession in order to enhance the accuracy of the surface description. This also enables the selection of only a given region of the surface which is to be further refined by means of the method in accordance with the invention.

BRIEF DESCRIPTION OF THE DRAWINGS

The invention will be described in detail hereinafter with reference to the drawing. Therein.

DETAILED DESCRIPTION OF THE PREFERRED EMBODIMENTS

Figure 1:
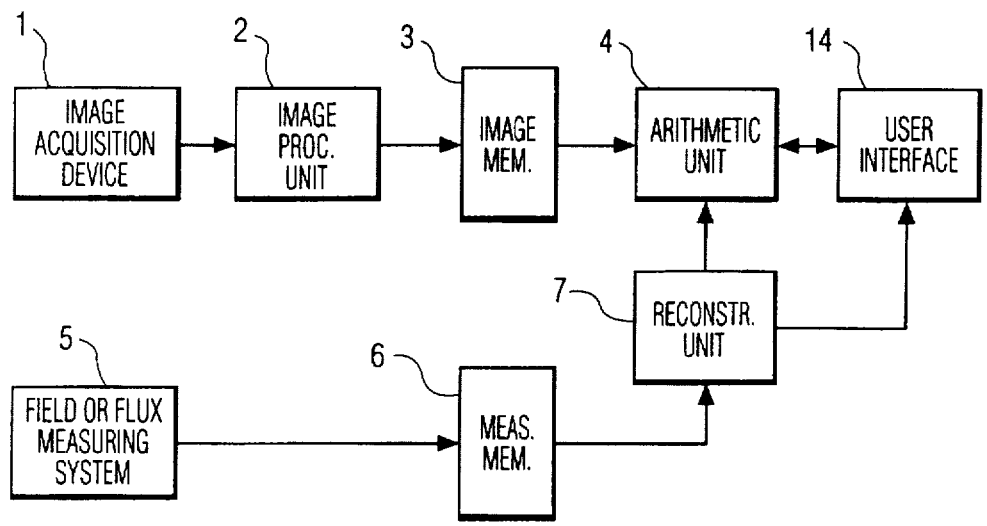
FIG. 1 shows a block diagram of a device for carrying out the method of the invention.

FIG. 1 shows a block diagram of a device for reconstructing the current density distribution in a biological object, for example in the human heart or brain. An image acquisition measuring device 1, for example a CT X-ray tomograph or an MR apparatus, forms a number of slice images or 3D images of the object to be examined. On the basis of these images an image processing unit 2 forms a body model which approximately describes the object surface by means of a number of triangles. The position information in the vertices of these triangles and the normals to the object surface in these vertices are stored in an image memory 3. These image values are used in the arithmetic unit 4 in order to form a refined mesh describing of the surface in conformity with the method of the invention. Physical measured values, for example the electric field strength or the magnetic flux density, are measured in a plurality of points outside the object, using a measuring system 5, for example a measuring system comprising a superconducting gradiometer device. Measuring systems of this kind are known (DE-OS 37 35 668). These measured values are also stored in a memory device 6. Finally, in the reconstruction unit 7 the current density distribution in the object is reconstructed from the stored physical measured values and the calculated image values by applying the known method (see IEEE Trans. on Biomed. Eng., Vol. 36, No. 3, pp. 382-391).

The user can influence the method via a user interface, for example the user can increase the refinement by repeating the steps executed by the arithmetic unit 4 several times. The user can also determine how many sub-triangles are substituted for an initial triangle. To this end, via the user interface 14, the user can notably access also the output of the arithmetic unit 4 and the reconstruction unit 7, via the user interface 14.

Figure 2:
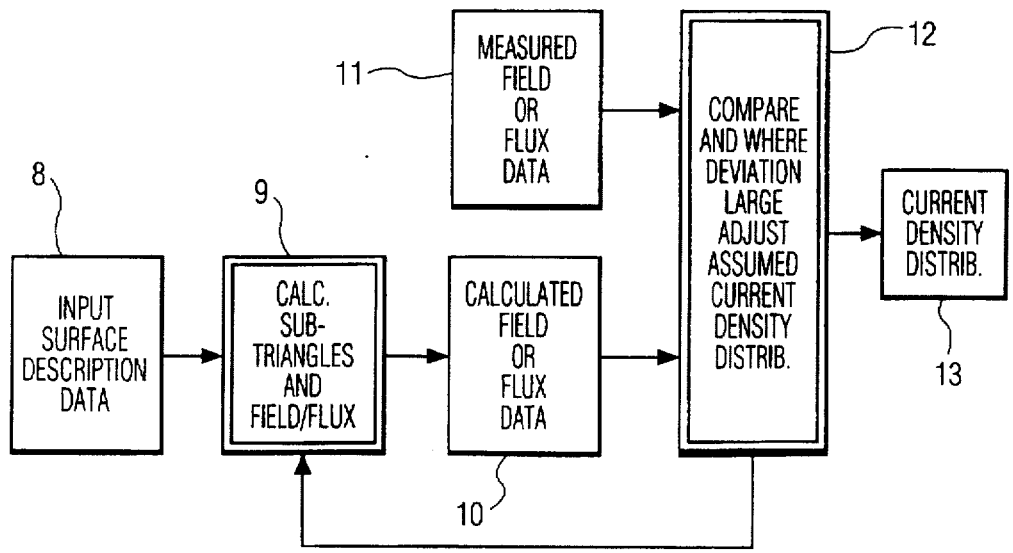
FIG. 2 shows a diagram illustrating the calculation steps involved in the source reconstruction.

The diagram of FIG. 2 shows which calculation steps are essentially required for the reconstruction of the sources of a measured electric and/or magnetic field. The reference 8 denotes the data of input data for the reconstruction method. This mass contains information for the approximative description of the surfaces of the part of the body whose electric and/or magnetic field has been measured. According to the BEM, this information consists of image data derived by means of the 3D scanning technique describing the body as a closed mesh of surface triangles, the coordinates of the vertices of which are known. Furthermore, the normals to the body surface in these vertices are known as input data. Using the BEM, this input data is processed in a processing step 9 involving arithmetic unit 4 and reconstruction unit T as will be described in detail hereinafter. This step of the method yields calculated data 10 concerning the electric and/or magnetic field of a current density distribution, assumed for the calculation. This data 10 is compared with the measured data 11 of the electric and/or magnetic field in the subsequent step of the method which is denoted by the reference 12. If the deviation between the data is too large, the step 9 is continued with a different assumed current density distribution until the desired accuracy of correspondence between the calculated data 10 and the measured data 11 is achieved. This yields the current density distribution 13 in the body whose electric and/or magnetic field has been measured.

Figure 3:
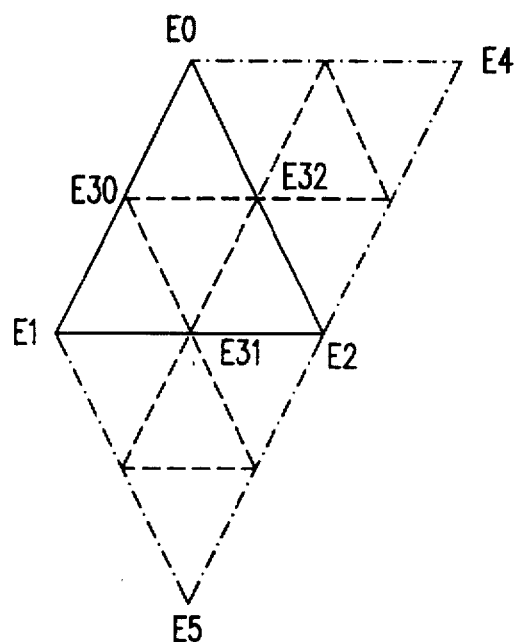
FIG. 3 shows a diagram for subdividing triangles into sub-triangles according to the BEM.

FIG. 3 shows how triangles are subdivided into smaller sub-triangles according to the BEM. This figure shows a part of a given mesh of triangles having vertices E0, E1, E2, E4 and E5. According to the known method the triangle E0-E1-E2 is subdivided in that a new vertex E30, E31 and E32 is chosen at the middle of each side, so that in total four sub-triangles are formed which are situated in the same plane as the initial triangle E0-E1-E2.

In accordance with the invention, a new vertex is not situated on a side of the initial triangle but perpendicularly across the middle of the side, outside the plane of drawing of FIG. 3. It is only in exceptional cases where the normals of two neighboring vertices are exactly opposed or directed exactly perpendicularly to the connecting line that the intermediate new vertex is situated on the side of the initial triangle. Because a new vertex is dependent only on data of the adjoining vertices, this method also ensures that the new sub-triangles again yield a closed mesh for the surface description. Each new vertex need thus be calculated only once, even though it is used for the subdivision of two initial triangles (for example, the new vertex E32 for the initial triangles E0-E1-E2 and E0-E2-E4).

Figure 4:
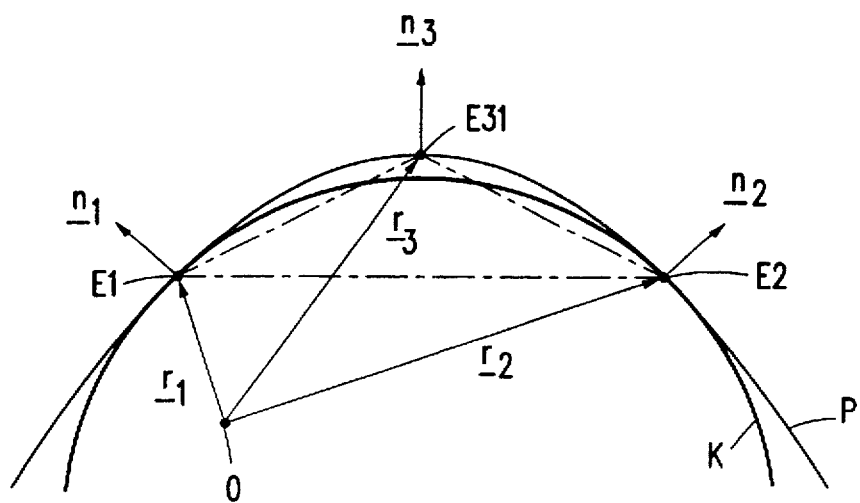
FIG. 4 is a sectional view of a model body, the most important quantities for determining a new vertex in accordance with the method of the invention also being indicated.

FIG. 4 is a sectional view of a model body (in this case a semi-sphere) on the basis of which the calculation of a new vertex E31 will be explained. Of the vertices E1 and E2 of an initial triangle there are known the position vectors $r_1$ and $r_2$, which originate from the origin 0 as well as the normal vectors $n_1$ and $n_2$ to the body surface K in these vertices. The line E1-E2 is a common side of the triangles E1-E2-E0 and E1-E2-E5 of FIG. 3 and upon subdivision it changes into the lines E1-E31 and E31-E2 which should approximate the body surface K as well as possible. To this end, a parabola P is drawn through the vertices E1 and E2 in such a manner that the normals $n_1$ and $n_2$ extend perpendicularly to the parabola P. The equation for the position vector $r_3$ of all points E31 situated on the parabola P between E1 and E2 is:

$$r_3(\lambda) = r_1 + \lambda \cdot \Delta r = \lambda \cdot (1-\lambda) \cdot d \cdot a \qquad (1)$$

with the abbreviation $\Delta r = r_2 - r_1$.

The parameter a is chosen as $$a = m - (m \cdot \Delta r)/(\Delta r)^2 \cdot \Delta r, \tag{2}$$

where $$m = (n_1 + n_2)/2. \tag{3}$$

For the parameter d:

$$d = \frac{(\underline{n_2} \cdot \Delta \underline{r}) \cdot (\underline{n_2} \cdot \underline{a}) - (\underline{n_1} \cdot \Delta \underline{r}) \cdot (\underline{n_1} \cdot \underline{a})}{(\underline{n_1} \cdot \underline{a})^2 + (\underline{n_2} \cdot \underline{a})^2} \tag{4}$$

or $d = 0$, if $(\underline{n_1} \cdot \underline{a}) = (\underline{n_2} \cdot \underline{a}) = 0$.

The position of the new vertex E31 on the parabola can be determined by means of the parameter $\lambda \in [0;1]$. In FIG. 4 $\lambda$ is chosen to be equal to ½, so that E31 is situated halfway between E1 and E2 and the equation (1) is simplified as $$r_3 = (r_1 + r_2)/2 + d/4 \cdot a. \tag{5}$$

Thus, the position vector $r_3$ can be determined from equation (5) by means of the equations (2) and (4). The normal in this point E31 is obtained by linear approximation of the known normal for generally $\lambda \in [0;1]$ in conformity with $$n_3(\lambda \cdot (n_2 - n_1)) \tag{6}$$

or in the case shown for $\lambda = \frac{1}{2}$ in conformity with $$n_3 = (n_1 + n_2)/2 \tag{7}$$

Based on a given number of N vertices, from the number of 2·N−4 triangles there is formed a larger number of smaller sub-triangles which constitute a closed mesh which more accurate describes of the body surface.

Figure 5A:
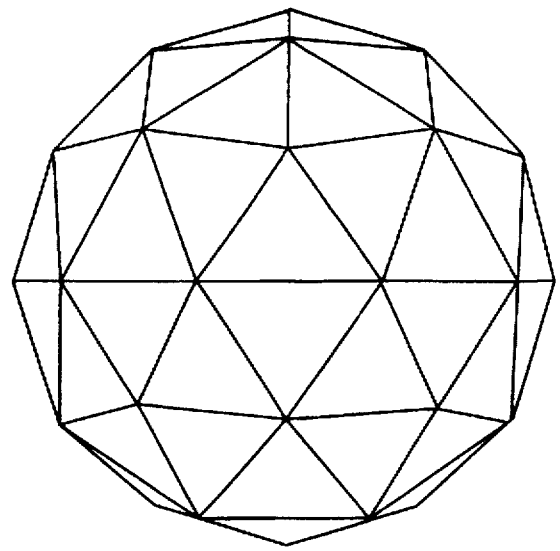
FIG. 5a shows a spherical surface approximated by triangles.
Figure 5B:
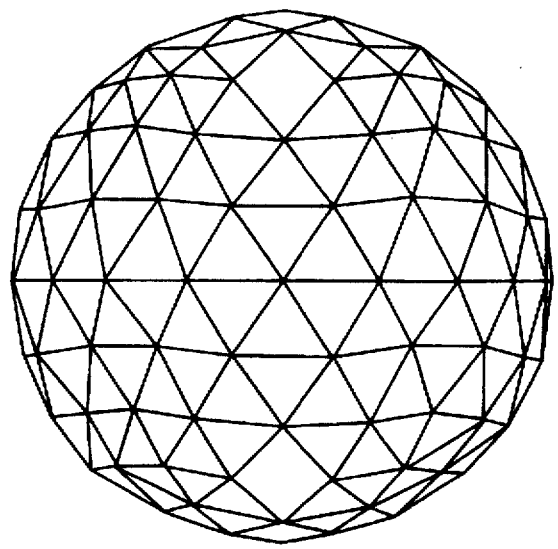
FIG. 5b shows a spherical surface approximated better by the method of the invention.

This is illustrated in the FIGS. 5a and 5b. In FIG. 5a a sphere is approximately described by 42 vertices and 80 triangles. The use of the method in accordance with the invention results in a spherical surface as shown in FIG. 5b, comprising 162 vertices and 320 sub-triangles. The various grey levels indicate how the sub-triangles spatially emerge from the flat triangles of the description in conformity with FIG. 5a.

The sum of the surfaces of 320 plane triangles, approximately describing a spherical surface, deviates approximately 2% from the exact value of the spherical surface. Refinement of the mesh of triangles in the triangle plane does not offer an improvement, whereas after a spatial refinement by means of the method of the invention the surface description by way of 1280 triangles deviates merely 0.2% from the exact value.

For a further comparative calculation a current dipole was assumed to be present within a sphere of radius 1 and in a point situated at a distance of 0.8 from the sphere center. Let the sphere be described by 320 plane triangles. The maximum potential error, related to the potential on an analytically exactly described spherical surface, was found to be 11%. When each of the 320 triangles was subdivided into four sub-triangles by means of the known method, a maximum error of 9.7% was obtained; after a further subdivision into each time four sub-triangles, the error amounted to 9.4%. A subdivision of the 320 initial triangles into each time four spatially adapted sub-triangles was found to reduce the maximum error to 2.8%; via a further spatially adapted subdivision into each time four further sub-triangles a maximum error of 0.8% was achieved.

As has been demonstrated, the method of the invention reduces the error by approximately a factor of 10. A specified reconstruction accuracy, therefore, requires a number of surface elements which is approximately 10 times smaller. Because in the case of the BEM the required storage is proportional to the square of the number of surface elements and the calculation time is proportional to the third power of this number, the storage requirements are reduced approximately by a factor of 100 and the calculation time by approximately a factor of 1000. Merely the expenditures for calculating the new vertices are greater in comparison with the known decomposition into plane sub-triangles.

In order to minimize the cost in respect of storage and calculation time during the calculation of the refined mesh of triangles by means of the method of the invention, each initial triangle may also be replaced, for example by two sub-triangles, in which case only a single new vertex need be calculated per initial triangle. On the other hand, the accuracy can also be enhanced at will by replacing each sub-triangle by further sub-triangles, for which purpose the method of the invention is carried out a number of times in succession. Moreover, more than one vertex can be chosen on the connecting line between two vertices of an initial triangle. It is to be noted, however, that any refinement of the surface description should yield a closed mesh again.

Further feasible applications of the method of the invention are, for example the calculation of the mass or the moment of inertia of an arbitrary spatial object, for example the lifting surface of an airplane.

We claim:

1. A method of reconstructing the surface of an object using a boundary element method, comprising:

approximately describing a closed object surface by a number of initial triangles, wherein the positions of the vertices of the triangles are known, as are the normals to the object surface at these vertices; and replacing said initial triangles with sub-triangles, each sub-triangle having no more than two vertices corresponding to vertices of an initial triangle and having at least one new vertex, each new vertex lying on a curved connecting line determined through two vertices of the initial triangle in such a manner that the curved connecting line extends perpendicularly to the normals to the measured object surface at the vertices of the initial triangle.

2. A method as claimed in claim 1, wherein the curved connecting line is shaped as a parabola or a segment of circle approximating the measured object surface between the vertices of the initial triangle.

3. A method as claimed in claim 2, wherein the new vertex is situated at equal distances from the two vertices of the initial triangle through which the curved connecting line is determined.

4. A method as claimed in claim 1 wherein the new vertex is situated at equal distances from the two vertices of the initial triangle through which the curved connecting line is determined.

5. A device comprising:

a measuring device for acquiring position information of points on an object surface and information concerning normals to the object surface at these points;

an image memory for storing said position and normal information;

an image processing unit for forming an approximative description of the object surface by triangles using a boundary element method in which a measured, closed object surface is approximately described using a number of initial triangles, wherein the positions of the vertices of each triangle are known, as are the normals to the measured object surface at these vertices; and an arithmetic unit for calculating further new vertices in order to determine sub-triangles which replace the initial triangles, each sub-triangle having no more than two vertices corresponding to vertices of an initial triangle, each new vertex lying on a curved connecting line determined through two vertices of the initial triangle in such a manner that the curved connecting line extends perpendicularly to the normals to the measured object surface at the two vertices of the initial triangle.

6. A device as claimed in claim 4 wherein the object is a biological object and the device is for the reconstruction of a current density distribution in the object, the device also comprising:

a measuring device for measuring values of magnetic flux density or electric field strength outside the object, a storage device for storing the flux density or field strength values thus measured, an image forming device for forming images of the object, and a reconstruction unit for determining the current density distribution in the object.

7. A device as claimed in claim 6, wherein the image forming device is a X-ray computer tomograph or a magnetic resonance imaging device.

8. A device as claimed in claim 7, wherein a user interface is provided for controlling the arithmetic unit.

9. A device as claimed in claim 6, wherein a user interface is provided for controlling the arithmetic unit.

10. A device as claimed in claim 5, wherein a user interface is provided for controlling the arithmetic unit.

* * * * *